United States Patent
Matsumoto et al.

[11] Patent Number: 6,001,287
[45] Date of Patent: Dec. 14, 1999

[54] METHOD OF PRESS-MOLDING THERMOPLASTIC RESIN

[75] Inventors: Masahito Matsumoto, Osaka; Masaaki Tsutsubuchi, Chiba; Takeo Kitayama, Osaka; Yukito Nakamura, Chiba; Yoshiaki Togawa, Osaka, all of Japan

[73] Assignee: Sumitomo Chemical Company, Limited, Osaka, Japan

[21] Appl. No.: 09/097,595

[22] Filed: Jun. 16, 1998

Related U.S. Application Data

[63] Continuation of application No. 08/728,315, Oct. 9, 1996, Pat. No. 5,795,510.

[30] Foreign Application Priority Data

Oct. 11, 1995 [JP] Japan ................................ 7-262675

[51] Int. Cl.⁶ .................................................. B29C 45/56
[52] U.S. Cl. .................... 264/40.5; 264/328.7; 425/150; 425/590
[58] Field of Search ................. 264/40.1, 40.5, 264/2.2, 328.7; 425/150, 145, 155, 575, 590

[56] References Cited

U.S. PATENT DOCUMENTS

| | | | |
|---|---|---|---|
| 4,917,840 | 4/1990 | Harada et al. | 264/40.5 |
| 5,057,255 | 10/1991 | Sato et al. | |
| 5,059,364 | 10/1991 | Okubo et al. | 264/328.7 |
| 5,063,008 | 11/1991 | Wenskus, Jr. et al. | 264/328.7 |
| 5,130,075 | 7/1992 | Hara et al. | 264/328.7 |
| 5,252,269 | 10/1993 | Hara et al. | 264/328.7 |
| 5,525,285 | 6/1996 | Matsumoto | 264/328.7 |
| 5,547,619 | 8/1996 | Obayashi | 264/40.5 |
| 5,838,571 | 11/1998 | Lewis | 264/40.5 |

FOREIGN PATENT DOCUMENTS 01241417   9/1989   Japan.

*Primary Examiner*—Jill L. Heitbrink
*Attorney, Agent, or Firm*—Pillsbury Madison & Sutro LLP

[57] ABSTRACT

A thermoplastic resin is molded by a press-molding method wherein a thermoplastic resin in a molten state is compressed to flow between a pair of female and male molds so as to be formed into a predetermined shape. A compression rate of the mold is controlled so that the following expression (1) is satisfied:

$$0.5 \leq B/A \leq 2 \qquad (1)$$

wherein A (mm/s$^2$) is an acceleration which is realized at a time when the compression rate is 75% of a maximum rate in a compression-acceleration region, which region is defined as a period of time from a moment when the compression of the molten thermoplastic resin is started to a moment when the compression rate reaches the maximum rate; and B (mm/s$^2$) is a deceleration which is realized at a time when the compression rate is 75% of the maximum rate in a compression-deceleration region, which region is defined as a period of time from a moment when the compression rate reaches the maximum rate to a moment when the closing of the molds is complete. By this method, a molded article having excellent surface appearance free from unevenness of gloss and surface irregularity can be obtained.

3 Claims, 2 Drawing Sheets

METHOD OF PRESS-MOLDING THERMOPLASTIC RESIN

This is a continuation of application Ser. No. 08/728,315, filed Oct. 9, 1996, now U.S. Pat. No. 5,795,510.

BACKGROUND OF THE INVENTION

1. Field of the Invention

The present invention relates to a method of press-molding a thermoplastic resin. Hereafter, a thermoplastic resin is referred to as a "resin".

2. Description of the Prior Art

A well known method of press-molding a resin involves supplying a resin in a molten state between a female mold and a male mold which are in an unclosed state. The resin is then compressed between the molds so as to be formed into a predetermined shape. In such a molding method, a short shot of the resin (that is, insufficient filling of the resin into a mold cavity), results in sink or warpage on a surface of a product. There have been efforts to reduce such defects by increasing or reducing a compression rate in a compression step in accordance with the size of the product, so as to absolutely control the compression rate. One such effort is described, for example, in Japanese Patent Kokai No. 241417/1989, and its counterpart U.S. Pat. No. 5,057,255.

However, even the above-mentioned method in which the compression rate is controlled has proven unsatisfactory in preventing defects in the appearance of a resin molded article; surface defects, such as unevenness of gloss and irregularity of the surface of the molded article tend to remain.

SUMMARY OF THE INVENTION

The present inventors have conducted extensive research for a method for preventing the above defects of a resin molded article obtainable by a method of press-molding a resin. As a result, we have discovered that, in a method of press-molding a resin wherein a resin in a molten state is compressed to flow between the molds so as to be formed into a predetermined shape, the relationship between a changing rate of the compression rate in a compression-acceleration region and a changing rate of the compression rate in a compression-deceleration region can be controlled so that a molded article having satisfactory surface appearance, free from unevenness of gloss or irregularity is obtained.

The method of the present invention therefore concerns press-molding a resin wherein a resin in a molten state is compressed to flow between a female mold and a male mold so as to be formed into a predetermined shape, in which the female and male molds are compressed at a compression rate which is controlled to satisfy the following expression (1)

$$0.5 \leq B/A \leq 2$$

wherein A (mm/s$^2$) is an acceleration which is realized at a time when the compression rate is 75% of a maximum rate in a compression-acceleration region which region is defined as a period from a moment when the compression of the molten resin is started to a moment when the compression rate reaches the maximum rate; and B (mm/s$^2$) is a deceleration which is realized at a time when the compression rate is 75% of the maximum rate in a compression-deceleration region which region is defined as a period from a moment when the compression rate reaches the maximum rate to a moment when closing of the molds is completed (compression and forming of the resin is completed).

DETAILED DESCRIPTION OF THE EMBODIMENTS

Figure 1:
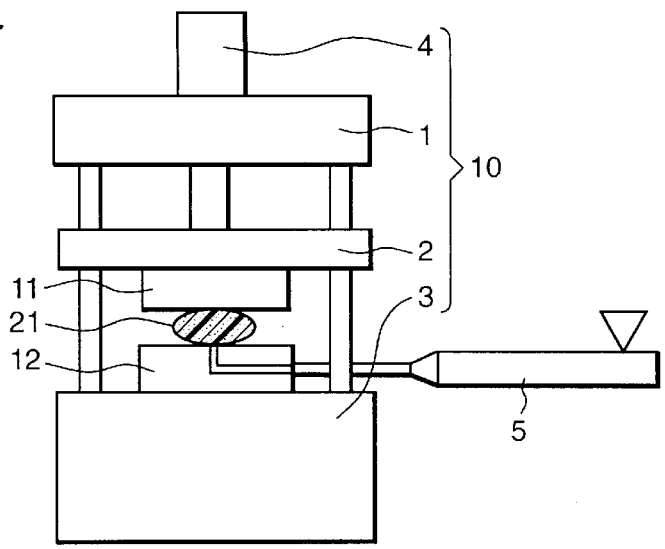
FIG. 1 is a schematic view of an apparatus to be adapted to a press-molding method according to the present invention.

In the following, the present invention will be explained in detail with reference to drawings. Here, in the drawings, parts identical or equivalent to each other will be referred to with the same reference numerals.

FIG. 1 is a schematic view of an apparatus to be adapted to a press-molding method according to the present invention. In FIG. 1, numeral 10 indicates an overall body of a press unit. The unit basically includes an upper structure 1, a movable platen 2, a fixed platen 3 and a compression cylinder 4. A pair of molds comprised of a female mold 11 and male mold 12 are mounted on the movable platen 2 and the fixed platen 3, respectively.

Such a press unit may be arranged to perform compression in the vertical direction as illustrated in FIG. 1 or in the horizontal direction (not shown in any figure), as would be apparent to those skilled in the art. Also the arrangement of the movable platen 2 and the fixed platen 3 is not limited to the illustration. When the molds are clamped in the vertical direction, the movable platen 2 may be disposed below (in a lower portion) or above (an upper portion) of the fixed platen 3. In the case that the clamping direction is made to be in the horizontal direction, the movable platen 2 may, of course, be disposed to the right side or to the left side of the fixed platen 3. Moreover, the structure of the press unit may be in the form in which a compression function is imparted to the body of the mold. These variations do not affect the method of the present invention and are not essential.

The method of the present invention generally includes the following steps:

obtaining a resin 21 in a molten state from a plasticizing and supplying unit 5 and supplying the molten resin between a female mold 11 and a male mold 12 attached to the movable platen 2 and the fixed platen 3, respectively;

operating a compression cylinder 4 to shift, i.e., urge, the movable platen 2 towards the fixed platen 3;

compressing and forming the molten resin between the two molds 11, 12;

cooling the compressed and formed resin to solidify the resin; and extracting a molded article from the molds.

In the method of the present invention, the timing when the resin is supplied to the molds and when the compression of the resin is performed are not limited particularly. Supplying the resin and compressing of the resin may overlap partially or completely. Alternatively, compression may be performed simultaneously with or after completion of the resin supply step.

FIG. 1 illustrates an embodiment wherein the molten resin is supplied between the molds through a passage provided in the male mold 12. Where the compression is started after the completion of the supply of the resin, an external resin supply unit provided outside of the molds, may be inserted between the molds and employed to supply the molten resin between the molds.

In the process of this invention, the compression rate is controlled so that the following expression 1 is satisfied:

$$0.5 \leq B/A \leq 2 \qquad (1)$$

wherein A (mm/s$^2$) is an acceleration which is realized at a time when the compression rate is 75% of a maximum rate in a compression-acceleration region which corresponds to the period of time from a moment when the compression of the molten resin is started to a moment when the compression rate reaches the maximum rate; and B (mm/s$^2$) is a deceleration which is realized at a time when the compression rate is 75% of the maximum rate in a compression-deceleration region, which corresponds to the period of time from the moment when the compression rate reaches the maximum rate to a moment when closing of the molds is completed. As a result, rapid change in the flowing rate (velocity of flow) of the molten resin in the mold can be prevented so that a molded article having satisfactory surface appearance free from unevenness of gloss or irregularity may be obtained.

In the present invention, when the female mold 11 and male mold 12 are completely closed, the compression rate becomes zero. The completion of forming of the resin corresponds to the completion of closing of the molds. The "compression rate" is a speed of movement of the molds in a direction in which the molds are clamped (hereafter, such a direction is referred to as a clamping direction) when the molten resin is compressed by the two molds. The "start" of the compression of the resin means a start of applying pressure to the molten resin by the female mold 11 and male mold 12 moving in the clamping direction. Even in a case where the molds are in a paused state such that a relatively narrow cavity is formed and the molten resin supplied into the cavity flows in the cavity due to injection pressure while being in contact with the mold surfaces of the molds, a moment when the molds have started to move in the clamping direction is the compression start time. In this case, the compression rate at the compression start time is zero. Hereafter, such an embodiment is referred to as the "embodiment 1". In another case where the molds are continuously or discontinuously moved in the clamping direction before the resin is supplied and the molten resin is supplied between the molds during the movement, a moment when the supplied resin comes in contact with the mold surfaces of the female and male molds and the compression of the molten resin is actually started is the compression start time. In this case, a compression rate of zero or more is previously provided at a time when the compression is started. Hereafter, such an embodiment is referred to as the "embodiment 2".

Therefore, the present invention does not require the compression rate at the start of the compression to be zero. Hence, the "compression-acceleration region" in the present invention means a region from a moment when the compression is started to a moment when the compression rate reaches the maximum rate regardless of whether the compression rate at the start of the compression is zero or not.

The acceleration A and the deceleration B are defined as follows:

acceleration A:

An absolute value (mm/s$^2$) obtained by dividing the difference (mm/s) between compression rates respectively realized at a moment when the compression rate reaches 70% of the maximum rate and at a moment when the compression rate reaches 80% of the maximum rate in the compression-acceleration region by the periods of time required to reach the respective moments.

deceleration B:

An absolute value (mm/s$^2$) obtained by dividing the difference (mm/s) between compression rates respectively realized at a moment when the compression rate reaches 80% of the maximum rate and at a moment when the compression rate has been decelerated to 70% of the maximum compression rate in the compression-deceleration region, by the periods of time required to reach the respective moments.

Figure 2:
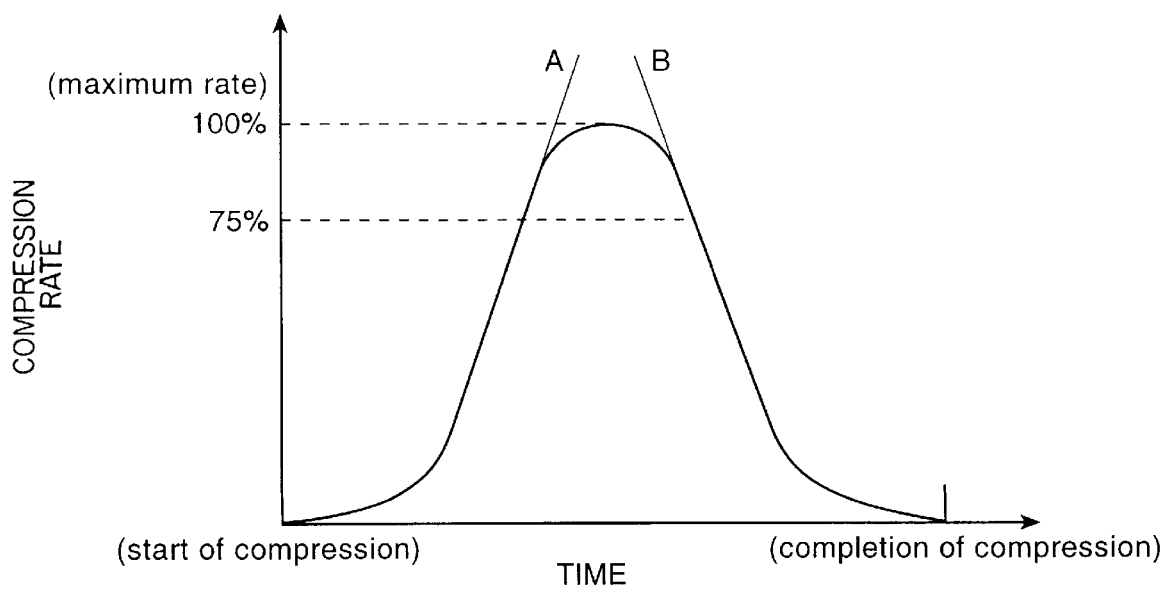
FIG. 2 is a graph showing changes in the compression rate realized by the method according to the present invention from the beginning of compression to completion of compression as time elapses.
Figure 3:
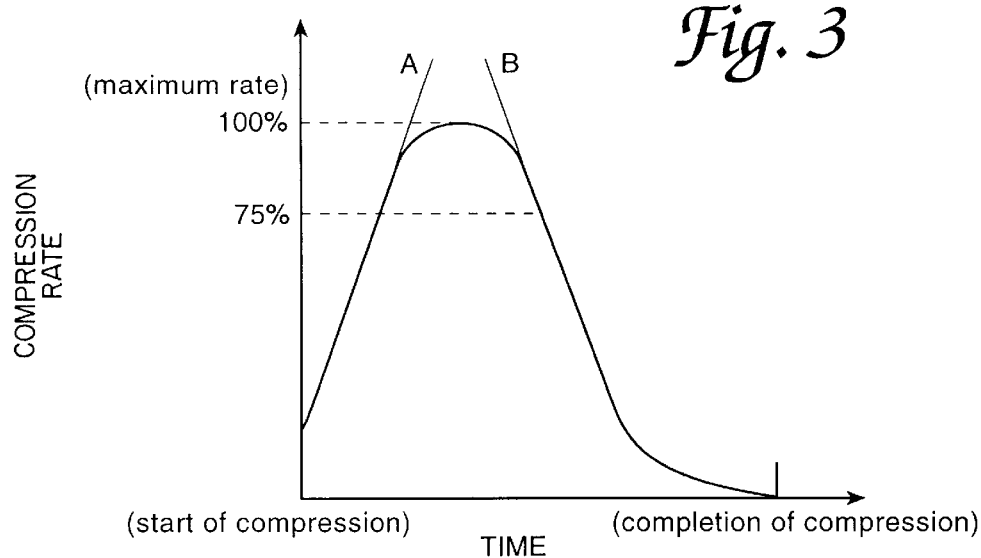
FIG. 3 is a graph showing changes in the compression rate realized by the method according to the present invention from the beginning of compression to completion of compression as the time elapses.

FIGS. 2 and 3 show examples of change in the compression rate as the time elapses occurring according to the present invention.

In the embodiment shown in FIG. 2, the compression rate at the compression start time (the time is zero) is zero. After the compression has been started, the compression rate is raised. After the compression rate has reached the maximum rate, the compression is continued while decelerating the compression rate until closing of the molds is completed, that is, until the compression rate is made to be zero. This embodiment corresponds to the embodiment 1. In FIG. 2, a region where a parabola is ascended to the right-hand corresponds to the compression-acceleration region, and a region where the parabola is descended to the right-hand corresponds to the compression-deceleration region.

On the other hand, in the embodiment shown in FIG. 3, closing of the molds is started before supply of the molten resin is started and the compression of the molten resin is started in a state where the compression rate (clamping rate) of zero or more has been provided. Then, the compression rate is raised to perform the compression. After the compression rate has reached the maximum rate, the compression is continued while decelerating the compression rate until closing of the molds is completed, that is, until the compression rate is made to be zero. This embodiment corresponds to the embodiment 2. In FIG. 3, a region where a parabola is ascended to the right-hand corresponds to the compression-acceleration region, and a region where the parabola is descended to the right-hand corresponds to the compression-deceleration region.

In the present invention, it is very important to control the compression rate in the compression-acceleration region and/or the compression-deceleration region so that the above-defined acceleration A (mm/s$^2$) and deceleration B (mm/s$^2$) satisfy the foregoing expression (1). If the press-molding process is performed under a condition where the value of B/A is out of the range defined by the expression (1), unevenness of gloss or surface irregularity takes place in an obtained molded article.

Figure 5:
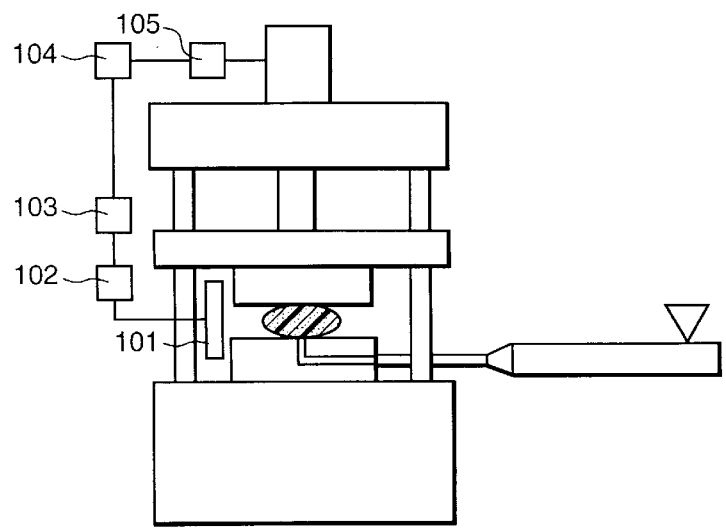
FIG. 5 is a schematic view of an apparatus to be adapted to a press-molding method according to the present invention.

A method of controlling the compression rate is not particularly limited and an arbitrary method may be employed, for example, (a) a method in which the press unit is driven by synchronizing a system for controlling the compression rate which is designed so that the acceleration A and the deceleration B satisfy the foregoing expression (1) with a system for supplying the molten resin;

(b) a method in which an apparatus, a schematic of which is shown in FIG. 5, includes a device 101 for continuously detecting the mold clamping rate (compression rate) which is changed as the time elapses; a device 102 for detecting rates respectively realized at moments when the compression rate reaches 70% or 80% of a maximum rate and a period of time between the two moments and calculating the acceleration A (mm/s$^2$) at the time when the compression rate is 75% of the maximum rate; means 103 for calculating the compression rate in the compression-deceleration region so that the acceleration A and the deceleration B satisfy the foregoing expression (1); and means 104 for transmitting the calculated compression rate to a unit 105 for controlling the compression rate, is employed and the compression rate in the compression-deceleration region is controlled according to the compression rate in the compression-acceleration region.

Although a relationship between the acceleration A and the deceleration B (that is, the ratio of B to A) is important for the press-molding method of the present invention, each absolute value is an arbitrary factor. It is preferable that the acceleration A be in the range from about 10 to about 400 MM/s$^2$. Similarly, the maximum compression rate is not particularly limited. In view of preventing rapid change in the flowing rate (velocity of flow) of the molten resin, it is preferable that the maximum compression rate is in the range from about 0.1 to about 40 mm/s.

The thermoplastic resin to be used in the press-molding method of the present invention is not particularly limited. Any thermoplastic resin that can be used in usual press-molding, injection-molding, extrusion-molding, blow-molding and the like, may be used. Exemplary thermoplastic resins include polypropylene, polyethylene, acrylonitrile-styrene-butadiene copolymer, polystyrene, polyamides such as nylon, polyvinyl chloride, polycarbonate, acrylic resin, styrene-butadiene copolymer, as well as thermoplastic elastomers such as EPM or EPDM, a mixture of any such resins or elastomers or a polymer alloy made from such resins or elastomers.

The press-molding method of the present invention can be adapted so that, as well as producing a molded article composed of only a resin (including a resin composition), so-called in-mold decoration molding may be performed, in which laminating and integrating a skin material onto the molten resin are simultaneously performed between the molds. In such an in-mold decoration molding, the skin material is supplied between the female and male molds prior to supplying the molten resin between the molds, and then the above-mentioned press-molding method of the present invention is performed. In this case, the skin material may be laminated on the entire surface of a resin substrate or a portion of the surface of the resin substrate. In in-mold decoration molding, irregularity of the surface of the skin material may be improved. The skin material may impart a decoration function, mechanical function, physical function (electromagnetism isolation function, heat isolation function or the like) or a chemical function (protective function against chemicals or the like) to the molded article. The skin material can have an arbitrary form, such as, for example, a film, a sheet, a plate or a cloth-like form. As for the material forming the skin, it may be a single material or combination of a plurality of materials to satisfy a particular objective.

The press-molding method of the present invention enables a molded article having excellent surface appearance free from unevenness of gloss and surface irregularity to be obtained.

EXAMPLES

The following non-limiting Examples further describe the invention.

Figure 4:
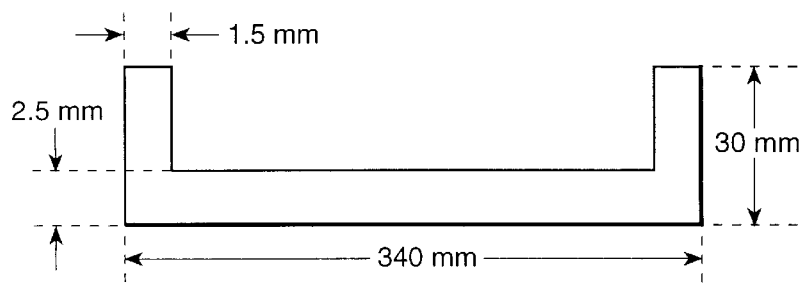
FIG. 4 is a schematic view of a molded article obtainable according to the present invention.

The press-molding method of the present invention was performed and the result are listed in Table 1. In these examples, an apparatus as shown in FIG. 1 was used, such that supply of resin and the operation of the compression cylinder were controlled to control the compression rate such that a predetermined maximum rate, the acceleration A in the compression-acceleration region and the deceleration B in the compression-deceleration region were realized. A polypropylene resin was used as the thermoplastic resin. A box-shaped molded article obtained in these examples had a square bottom face 340 mm on each side; a height of 30 mm; a bottom plate portion having a thickness of 2.5 mm; and side wall portions having a thickness of 1.5 mm, as shown in FIG. 4.

Note that a skin material used in Examples 5 and 6 and Comparative Examples 3 and 4 was formed of a TPO sheet (an olefin thermoplastic elastomer sheet having a thickness of 0.5 mm) lined with a polypropylene foamed sheet having a thickness of 3 mm and a foaming ratio of 15. This skin material was partially laminated on the inner bottom portion of the box-shaped resin substrate having the foregoing size.

TABLE 1

| Example No. | Resin | B/A | A (mm/s$^2$) | Maximum Rate (mm/s) | Skin Material | Surface Appearance |
| --- | --- | --- | --- | --- | --- | --- |
| Example 1 | Resin 1 | 0.6 | 70 | 10 | Not used | Neither unevenness of gloss or irregularity was observed |
| Example 2 | Resin 1 | 0.8 | 70 | 10 | Not used | Neither unevenness of gloss or irregularity was observed |
| Example 3 | Resin 1 | 1.0 | 120 | 20 | Not used | Neither unevenness of gloss or irregularity was observed |
| Example 4 | Resin 1 | 1.8 | 200 | 30 | Not used | Neither unevenness of gloss or irregularity was |

TABLE 1-continued

| Example No. | Resin | B/A | A (mm/s$^2$) | Maximum Rate (mm/s) | Skin Material | Surface Appearance |
|---|---|---|---|---|---|---|
| | | | | | | observed |
| Example 5 | Resin 2 | 0.7 | 120 | 15 | Used | Neither unevenness of gloss or irregularity was observed |
| Example 6 | Resin 2 | 1.9 | 120 | 15 | Used | Neither unevenness of gloss or irregularity was observed |
| Comparative Example 1 | Resin 1 | 0.3 | 70 | 10 | Not used | Unevenness of gloss was observed |
| Comparative Example 2 | Resin 1 | 2.3 | 70 | 10 | Not used | Unevenness of gloss was observed |
| Comparative Example 3 | Resin 2 | 0.4 | 120 | 15 | Used | Irregularity was observed |
| Comparative Example 4 | Resin 2 | 2.2 | 120 | 20 | Used | Irregularity was observed |

Resin 1 = Sumitomo Noblen AY564 (Polypropylene resin manufactured by Sumitomo Chemical Co., Ltd.)
Resin 2 = Sumitomo Noblen AZ564 (Polypropylene resin manufactured by Sumitomo Chemical Co., Ltd.)

What is claimed is:

1. A press-molding method for a thermoplastic resin wherein the thermoplastic resin in a molten state is compressed to flow between a pair of female and male molds so as to be formed into a predetermined shape, which comprises the steps of:

(a) providing a molding apparatus comprising a female mold and a male mold;

(b) supplying a molten thermoplastic resin between the female mold and the male mold;

(c) compressing and forming the molten thermoplastic resin between the female mold and the male mold, wherein the step of compressing is conducted under a condition where compression rate is controlled so that the following expression (1) is satisfied;

$$0.5 \leq B/A \leq 2 \tag{1}$$

wherein A (mm/s$^2$) is an acceleration which is realized at a time when the compression rate is 75% of a maximum rate before the compression rate reaches the maximum rate; and B (mm/s$^2$) is a deceleration which is realized at a time when the compression rate is 75% of the maximum rate after the compression rate has reached the maximum rate;

(d) cooling the compressed and formed resin to solidify the resin; and (e) extracting a molded article from the molds;

whereby a molded article having an even surface appearance is obtained.

2. The press-molding method of claim 1, wherein the acceleration A is within the range of from about 10 to about 400 mm/s$^2$.

3. The press-molding method of claim 1, wherein the maximum compression rate is within the range of from about 0.1 to about 40 mm/s.

* * * * *